Oct. 29, 1957  W. O. MORAN  2,811,095
POSITIVE DRAFT CONTROLLER
Filed Nov. 15, 1954  5 Sheets-Sheet 1
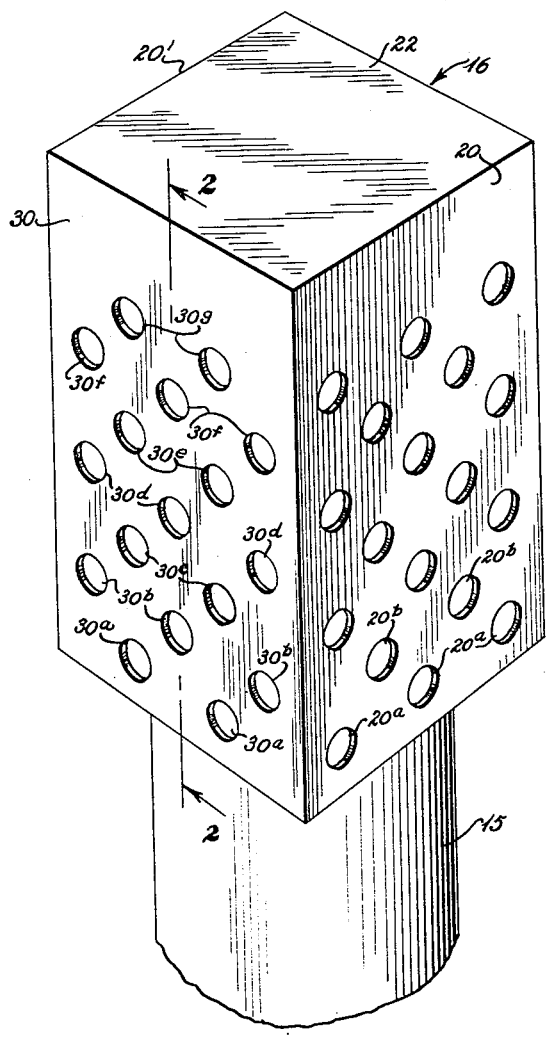
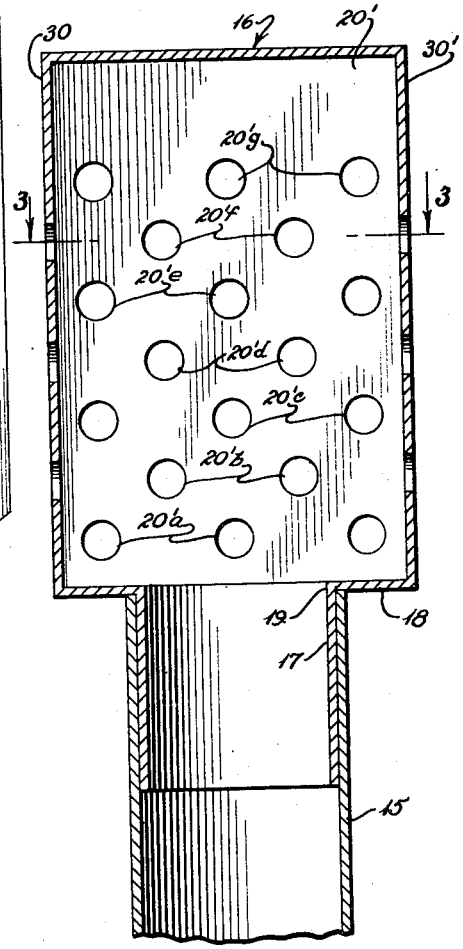
INVENTOR
William O. Moran
BY Beale and Jones
ATTORNEYS

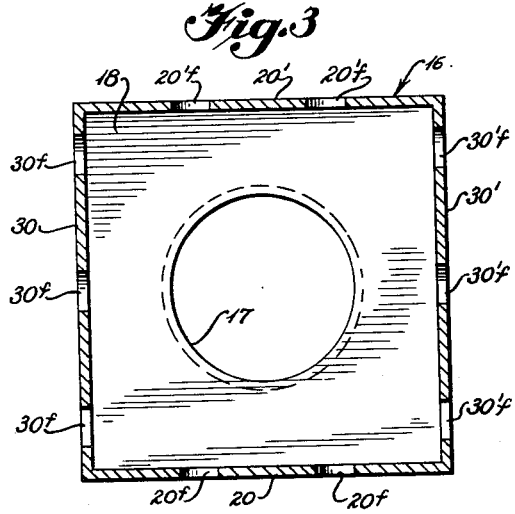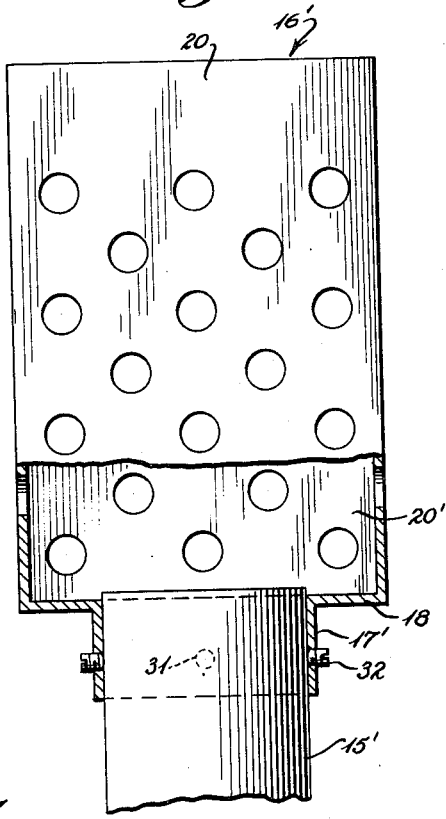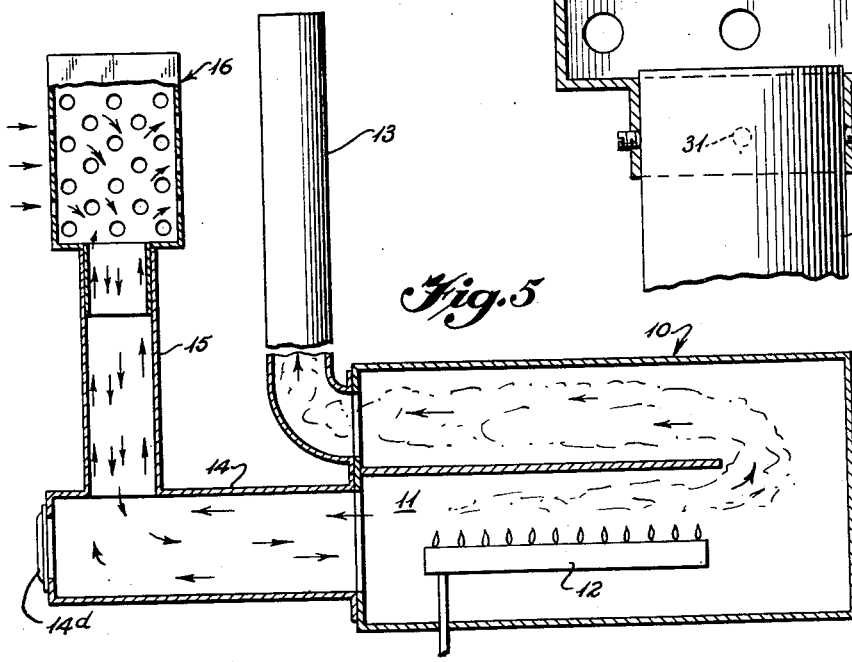

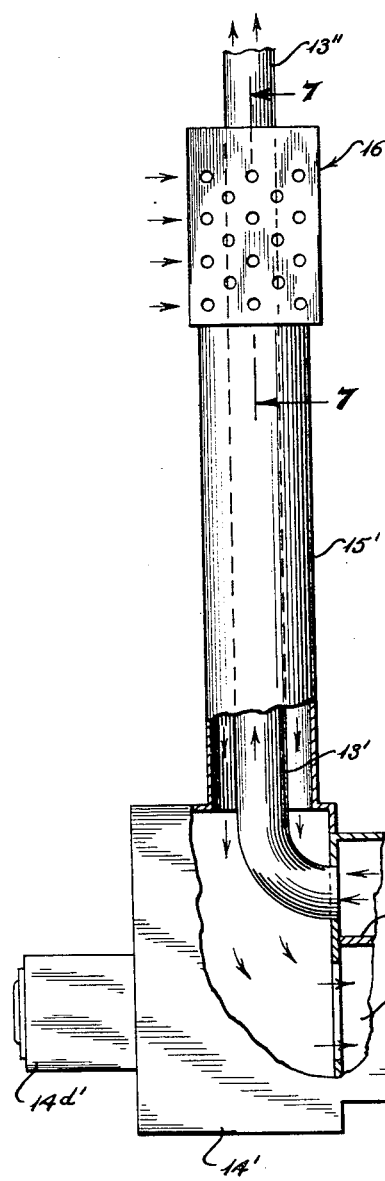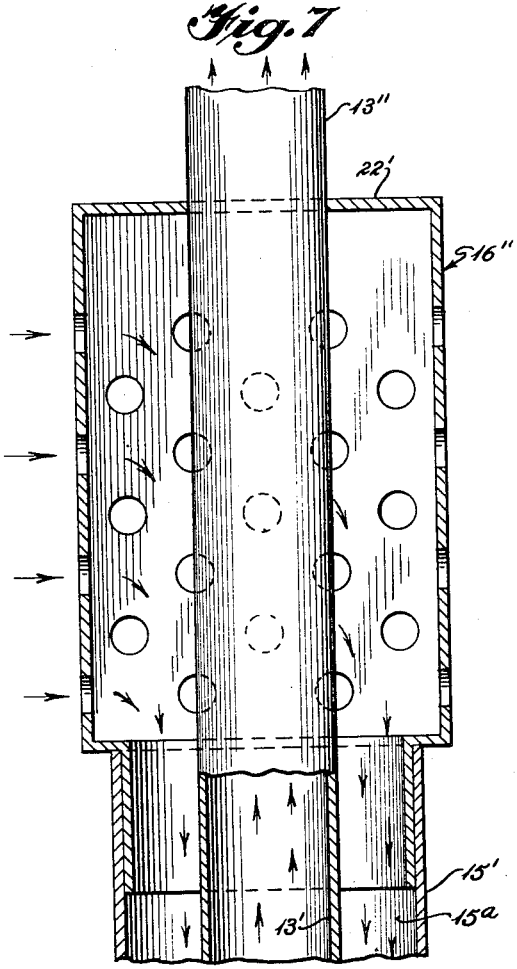

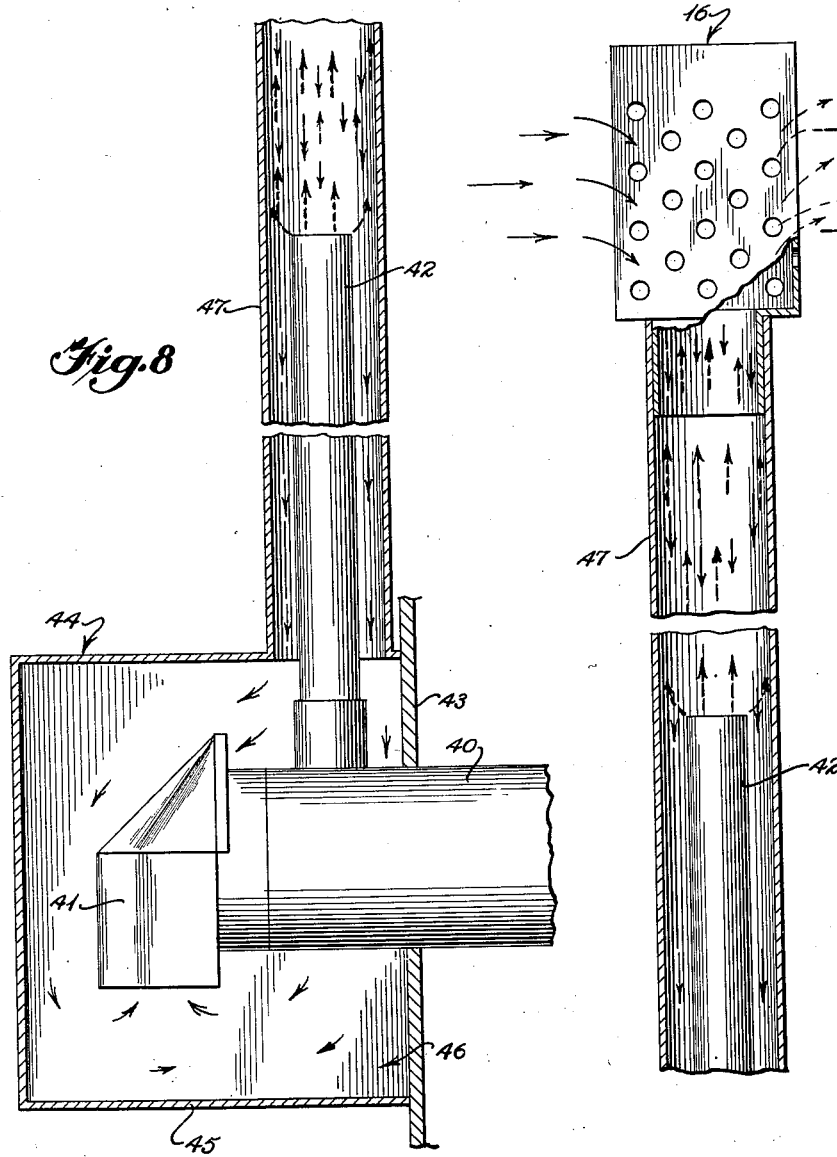
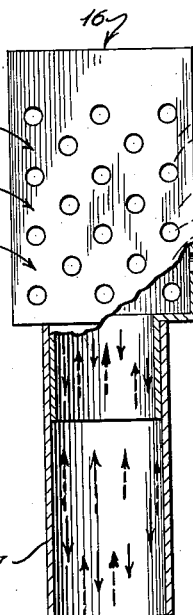

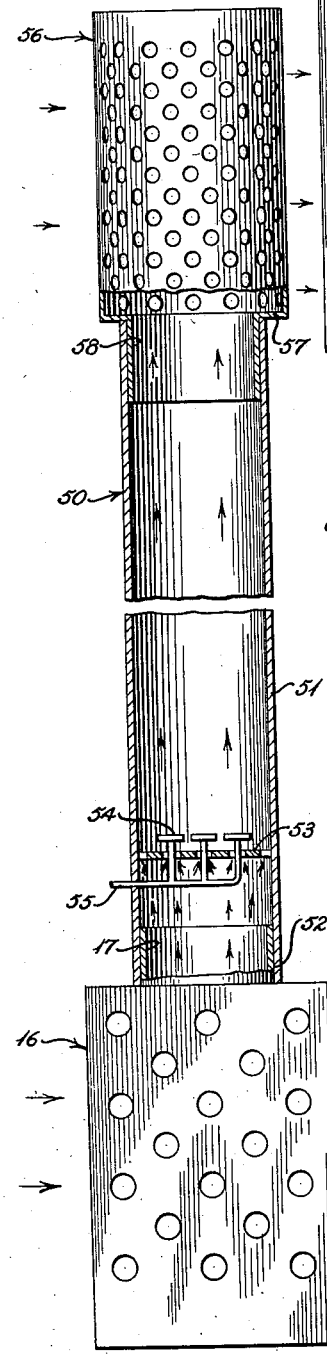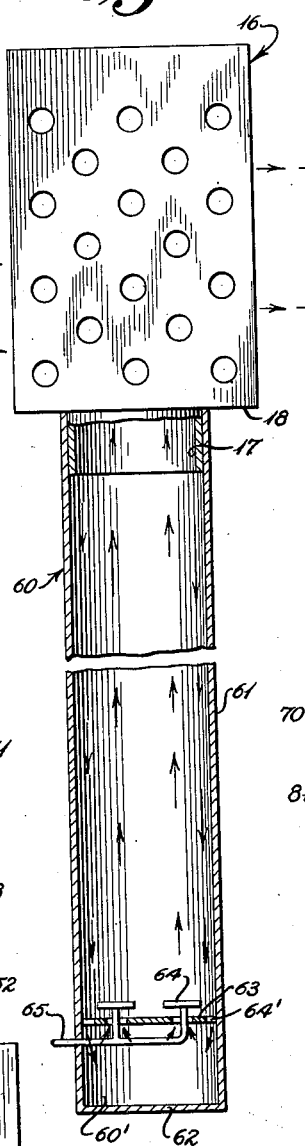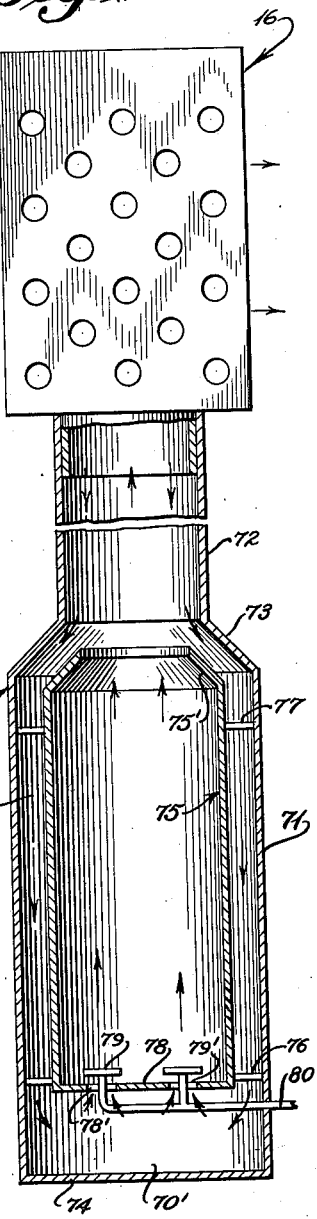

United States Patent Office 2,811,095
Patented Oct. 29, 1957

2,811,095

POSITIVE DRAFT CONTROLLER

William O. Moran, Tulsa, Okla.

Application November 15, 1954, Serial No. 468,852

14 Claims. (Cl. 98—62)

My invention is directed to a draft controller to assure a positive draft into a conduit or housing regardless of direct or relative wind conditions acting on the outside of the draft controller. This application is a continuation-in-part application of my copending application Serial Number 313,568, filed October 7, 1952, now U. S. Patent 2,701,999, issued February 15, 1955.

It is an object of my invention to provide a positive draft in a conduit or housing exposed to the outside atmosphere regardless of outside direct or relative wind conditions.

Another object of my invention is to provide a housing head for the air intake leading to a chamber which affords a positive draft into the chamber regardless of outside wind conditions.

A further object of my invention is to provide a housing head for the air intake leading to an enclosed chamber which breaks up the air currents passing into the housing head so that a uniform amount of air enters the chamber and a counter-flow of gases may take place with respect to the uniform air flow through the air intake leading to the chamber regardless of existing outside wind conditions.

A still further object of my invention is to provide a housing head for the air intake housing connected to a chamber to supply a uniform positive draft thereto regardless of wind conditions outside the chamber firebox and wherein the housing head for the intake air may be positioned at a greater height above the chamber than is the height of an exhaust stack leading from the chamber.

A still further object of my invention is to provide a positive draft to a chamber through a vertical conduit in communication therewith and through the same conduit introduce and pass exhaust gases leading from the chamber to provide a positive draft through the chamber.

Another object of my invention is to provide an air intake housing for a furnace firebox with a housing head which permits uniform air supply to the furnace firebox regardless of the wind conditions outside the furnace firebox and wherein the exhaust stack from the furnace extends within the air inlet housing and out through the housing head thus permitting a maximum use of a given space and at the same time some preheating of the intake air being conducted to the furnace firebox.

A still further object of my invention is to provide a positive draft to a vertical furnace wherein the bottom end is closed off and air for combustion flows downward while exhaust gases move upward through the vertical furnace.

Yet a still further object of my invention is to provide a positive and stabilized draft in a furnace by introducing air into the furnace firebox through a vertically disposed multi-sided housing having a plurality of spaced apart apertures in each side and an exhaust draft equalizing stack head.

A still further object of my invention is to provide a positive draft control for a furnace firebox wherein the furnace firebox has an enclosed housing in communication with its air induction opening and said housing has a reserve air induction chamber positioned below the induction opening to afford combustion air for quick lighting of the furnace and a housing head is in communication with said enclosed housing, said housing head breaking up the air currents passing into the housing head so that a uniform amount of air enters the furnace firebox.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention become apparent to those skilled in the art from this detailed description.

For a more complete understanding of the nature and scope of my invention, reference may be had to the follow detailed description taken in connection with the accompanying drawing in which:

Fig. 1 is a perspective view of a housing head mounted on the end of an air intake housing which is shown broken off at its lower end;

Fig. 2 is a vertical cross sectional view of the housing and housing head along line 2—2 of Fig. 1 but on a slightly different scale;

Fig. 3 is a horizontal cross sectional view of the housing head along line 3—3 of Fig. 2;

Fig. 4 is a side elevational view of a modified mounting of a housing head showing the lower portion of the housing head broken away;

Fig. 5 is a side elevational view partially in section showing a furnace having an air intake housing with a housing head mounted thereon;

Fig. 6 is a side elevational view partially in section of a furnace, air intake housing, air intake housing head and exhaust stack concentrically mounted within and extending through the air intake housing and the housing head;

Fig. 7 is a vertical cross sectional view along section line 7—7 of Fig. 6 on an enlarged scale;

Fig. 8 is a side elevational view of a furnace having an air induction housing with a reserve air section positioned below the furnace firebox, a vertical air intake conduit connected to the housing and the exhaust stack from the furnace housed within the vertical air induction housing;

Fig. 9 is an enlarged view of the vertical air induction conduit of Fig. 8 broken away at the bottom showing the exhaust stack of the furnace therein and a positive draft head according to Fig. 1 mounted on the air induction and exhaust conduit;

Fig. 10 is a partial vertical cross sectional view of a vertical furnace having a positive draft head attached to its base and a draft equalizing stack head at its top;

Fig. 11 is a partial vertical cross sectional view of a vertical furnace which is closed at its bottom and has surmounted on its top a positive draft head of the type shown in Fig. 1; and Fig. 12 is a partial vertical cross sectional view of another type of vertical furnace which is closed at the bottom and is surmounted at its top by a positive draft head of the type shown in Fig. 1.

Throughout the description like reference numerals refer to similar parts.

In Fig. 5 I have shown a typical furnace 10 housing a furnace firebox 11, a burner 12 in the firebox, an exhaust stack 13 leading from the furnace and an air intake housing 14—15 leading to the furnace firebox 11. The air intake housing in the form shown has a horizontal section 14, an inspection door 14d on the outer end thereof, and an upstanding section 15 in communication with the horizontal section 14. The intake air housing head 16 according to my invention is received on the upper end of the air intake housing section 15. While I have shown a typical furnace 10 in Figures 5 and 6, the furnace may equally as well be a chamber to which a positive draft is to be supplied and from which exhaust gases rise. Such a chamber might be one through which hot pipes or the like extend and in which a positive ventilation is desired.

In Figures 1, 2, and 3 there is shown an air intake housing head or positive draft head 16 as mounted on the air intake housing 14—15 in Fig. 5. Air intake housing 15 in the form shown is a cylindrical pipe. The air intake housing head 16 mounted on the upper end of the air intake housing 15 has a cylindrical thimble 17 at its base which is received in the upper end of the air intake housing 15 and a bottom transverse plate 18 attached to the upper end of thimble 17 and having an aperture 19 therein permitting direct communication between thimble 17 and the housing head proper to be described. The housing head proper is polygonal in shape with four vertically extending sides 20, 20', 30 and 30' attached to the outer edges of transverse bottom plate 18 and extending vertically therefrom and a transverse cover plate 22 attached to the upper edges of the sides 20, 20', 30 and 30'. In the form shown there are seven vertically spaced horizontal rows of ten apertures each. The bottom row, for example, is shown with three spaced apertures 20a in side 20, three spaced apertures 20'a in side 20' oppositely positioned to apertures 20a, two spaced apertures 30a in side 30 and two oppositely positioned apertures 30'a in side 30'. The second horizontal row of apertures from the bottom has two spaced apertures 20b in side 20, two oppositely spaced apertures 20'b in side 20', three spaced apertures 30b in side 30, and three oppositely spaced apertures 30'b in side 30'. The third, fifth and seventh rows from the bottom end are similarly arranged to the bottom row while the fourth and sixth rows of apertures from the bottom end are similarly arranged to the second row of apertures described above.

The apertures are of uniform shape and size, and while shown as round, they may have other shapes. The total area of the apertures is such as to permit free flow of air through the head and the air inlet housing and chamber to which the head is attached.

In Figure 4, a modified form of air intake housing head or positive draft head 16' is illustrated which has a modified thimble 17' that fits over an intake housing section 15'. The thimble 17' is provided with spaced apart threaded apertures 31 in which are threadedly received set screws 32 which press against the intake housing 15' to hold the positive draft head 16' in adjusted position on the end of intake housing 15'. The arrangements of the air passage apertures in the sides of positive draft head 16' are the same as in positive draft head 16 described above. It will be observed that the apertures in the front side 20' of positive draft head 16' are in direct alignment with the corresponding apertures in the back or opposite face 20' as illustrated in Figure 4.

Referring to Fig. 6, a furnace 10' similar to furnace 10 in Fig. 5 is illustrated. It is shown with a portion of the furnace 10' and air intake housing 14'—15' broken away. An access door and housing 14d' is shown on the lefthand end of air intake housing portion 14' in alignment with the furnace firebox 11'. In this modification shown in Fig. 6, the exhaust stack 13' from the upper portion of the furnace 10 above horizontal baffle 10b attaches on the same end of the furnace 10' as the air intake housing but extends by a right angle elbow through the air intake housing 14' and upwardly within the vertically disposed conduit of the air intake housing 15' in a concentric manner. Exhaust stack 13' extends as at 13'' through the stack head or positive draft head 16'' as shown best in the enlarged sectional view in Fig. 7.

The positive draft head 16'' is in all respects like the construction of head 16 depicted in Fig. 1 and described above. The exhaust stack 13' is a tubular conduit of smaller cross sectional size than the air intake housing 15' such that it may extend concentrically therethrough. An annular space 15a is thus provided around the exhaust conduit 13' and within the air intake housing or conduit 15'. The upper end of the exhaust stack extends vertically through an aperture formed in the top plate 22' of the positive draft head 16''. It will be noted that the exhaust stack 13' is shown broken off at its upper portion 13'' in Figures 6 and 7.

In carrying out my invention the air flow against the outside of the head 16 is broken up so that differently directed streams of air are caused to flow in the head and on into the air intake housing connected therewith. This break up of the air into streams by the head is thought to take place as a result of providing the apertured and planar sides which in part make up the polygonal shaped elongated tubular head. In Fig. 5 with the burner 12 in operation in the firebox 11, there will be a difference in temperature in the firebox and at the positive draft head 16 with the temperature lower at the head 16. This will cause a rise of some warm gases as indicated by the arrows within the air intake housings 14 and 15 which arrows are upwardly from the furnace firebox 11. Any such warm gases as pass through the air intake housings 14—15 will travel as counter currents to the incoming air entering the head 16 and traveling through the air intake housings 15—14 to support combustion in the chamber or furnace firebox 11. The warm gases passing outwardly through the conduits 14—15 will pass out the positive draft head 16 through the apertures in a side generally oppositely disposed to the air entering the head as diagrammatically illustrated by the positioning of the arrows in Fig. 5.

No matter what the force or direction of the outside wind conditions may be that are acting on the air intake or positive draft control head 16, there will be a uniform flow of air from the head to the air intake housing connected therewith and to the chamber to which the air intake housing is connected. The polygonal shaped head with its apertured sides is thought to break up the air flow and induce a uniform flow of air from the head to the chamber to which it may be connected to supply the designed demands of the equipment in which the chamber is located and with which the head is connected. With the polygonal shaped tubular body portion of the head a break up of the air currents takes place to supply the burner, for example, in the furnace firebox. At the same time, any increase of wind force or direction acting outside on the head will not affect this uniform flow of supply air from the head to the chamber to which it is attached. It is thought that some of the balancing effects of the wind pressure on the upwind side of the head, as explained more fully in my copending application Serial No. 313,568, filed October 7, 1952, now U. S. Patent 2,701,999, issued February 15, 1955, together with the vacuum created on the downward side of head also occurs with this positive draft control head. However, with the positive draft control head some of the wind currents are diverted by the head construction so that a positive draft is supplied to the air intake housing and the chamber to which the head may be attached.

There is maintained within the positive draft head 16 a still-day condition even though wind blows against the outside of the apertured planar sides. Thus, the atmospheric pressure within the head and the conduits and compartments connected therewith is at normal atmospheric pressure. By being able to maintain this normal atmospheric pressure condition regardless of outside wind conditions, a set condition can be maintained as for a firebox where the fire may be adjusted or brought up to a maximum efficiency as for a still day. Even though the fire is automatically turned on and off for a maximum and minimum demand, the still-day conditions are maintained with outside fluctuating conditions. Further, the atmospheric pressure in the postive draft head 56 as shown in Fig. 10 or in any other position where it may be used on an exhaust stack is maintained at normal atmospheric conditions regardless of outside wind or fluid conditions acting thereagainst and, thus, a set condition may be maintained within the head and the passages connected therewith.

When the postive draft head 16 is used on the air intake housing leading to a furnace firebox it is readily feasible to even extend the air intake housing to a greater vertical height than the exhaust stack leading from the same furnace.

In Fig. 8 there is shown a typical furnace 40 such as in my U. S. Patent 2,664,081, issued December 29, 1953, having a flash arrester 41 through which air for combustion is admitted to the firebox of the furnace. The exhaust stack for the furnace is indicated at 42. Furnace 40 is depicted extending through a wall 43 of a building with the air induction and the exhaust from the furnace on the outside of the wall 43.

Mounted over the protruding furnace 40 and its flash arrester 41 is an enclosed housing 44 having its bottom wall 45 extending horizontally and well spaced below the flash arrester 41 thereby providing a relatively large reserve air chamber or space 46 below the flash arrester 41 at the air induction end of the furnace 40. In quick lighting off of the furnace, air is drawn from this reserve air space so that there is always provided sufficient combustion air for the furnace. This feature of a reserve air supply in providing a positive draft for a furnace firebox is particularly important where furnaces are intermittently operated. This reserve air supply is available to light off the burner of the furnace thereafter the positive draft is furnished through the vertical air induction conduit 47. Housing 44 with its vertically extending air induction conduit 47 affords a positive draft for the furnace and at the same time is particularly effective in preventing fires where the furnace 40 is installed in meter houses and around oil and gas lines where combustible mixtures may be present.

The air induction conduit 47 is connected to and in communication with the top of housing 44 and is shown in Fig. 8 with its top end broken off. This air induction conduit 47 provides for both downward travel of induction air and upward travel of exhaust gases from the stack 42 as indicated by the arrows with solid arrows here representing fresh air movement and the broken arrows representing exhaust gas movement thought to exist. Conduit 47 may or may not be surmounted by a positive draft head 16, such as shown in Fig. 1. When a positive draft head is used better and more reliable performance is obtained. However, the arrangement as shown in Fig. 8 affords a positive draft to the furnace 40 and at the same time the air induction conduit 47 houses the relatively short exhaust stack 42 and conducts exhaust gases upwardly and air for combustion downwardly yet at the same time affording a positive draft to the furnace firebox.

In Fig. 9 there is shown the air induction and exhaust conduit 47′ similar to Fig. 8 and the exhaust stack 42′ similar to the exhaust stack 42 in Fig. 8. The air induction and exhaust conduit 47′ has mounted on its top a positive draft head 16 as shown in Figures 1 and 2 and described heretofore. This positive draft head 16 breaks up the air currents impinging thereon as described heretofore and induces combustion air down into the combustion air conduit 47′ and at the same time carries off the exhaust gases rising from exhaust stack 42′. As in Fig. 8, the fresh air movement thought to exist is represented here by solid arrows while the exhaust gas travel is indicated by broken arrows.

Referring to Figures 10, 11, and 12, there are shown vertical furnaces in which a positive draft is provided according to my invention. Figures 11 and 12 depict air induction and stack gas exhaust through the same conduit and through the positive draft head.

In Fig. 10 a vertical furnace of the gas or oil burning type is generally indicated at 50 having a tubular casing 51 with an open bottom end 52 in which is mounted in a vertical depending manner a positive draft head 16 such as shown in Figures 1 and 2. In the bottom of the furnace 50 is shown a conventional apertured transversely extending mounting plate through which extends typical burners connected to a gas supply line 55. Mounted on the top of the cylindrical casing 51 of the furnace is a draft equalizing stack head generally indicated at 56 and having an apertured transverse base end 57 resting on the top of vertical casing 51 and a thimble 58 depending from the apertured base 57 which is received in the top end of casing 51. The draft equalizing stack head is of the character described in my copending application Serial No. 313,568, filed October 7, 1952. The postive draft head 16 breaks up the air striking against its planar sides and passing through its apertures into currents which feed the burners 54. This positive draft is afforded regardless of wind direction or force that strikes the positive draft head 16. These types of vertical furnaces illustrated here find wide use in the oil and gas fields. They are subjected to extreme wind and weather conditions and remain unattended. It is of prime importance that their operation not be impaired by the wind and weather. Through the use of the positive draft head 16 and the draft equalizing stack head 56 a positive and stable draft is furnished the furnace so that it operates at still day efficiency even though subjected to extreme high wind and weather conditions.

In Fig. 11 another type of vertical furnace 60 is illustrated in which a vertical tubular casing 61 forms the furnace wall and it is closed off at its bottom by a plate. An apertured transverse burner support and air passage plate 63 is mounted in spaced relation to the bottom end of the casing 61. Typical burners 64 are mounted in plate 63 and supplied through a fuel supply conduit 65. Mounted on the top of tubular casing 61 is a positive draft head or casing 16 of the type shown in Figures 1 and 2. This positive draft head 16 has planar apertured sides as described in detail in Figures 1 and 2. It breaks up the air currents and permits a positive supply of combustion air to be supplied downwardly through the tubular casing 61 to the burners 64 and through the apertures 64′ in plate 64 thereby furnishing combustion air to and about the burners 64.

The positive draft head 16 surmounting the furnace 60 also in breaking up the air currents passing therethrough permits exhausting of the exhaust gases rising from the burners 64 through the tubular casing 61. This furnace 60 is likewise operable at still day efficiency even though extreme winds strike the furnace and the postive draft head 16 from varying directions and with varying force.

Fig. 12 shows a modified form of the vertical furnace depicted in Fig. 11. The furnace is generally indicated at 70 and is built with a vertical tubular base portion 71 which is connected at its top with a small vertically extending tubular casing 72 by the annular throat 73. The bottom end of the furnace is closed off by an integral transverse bottom plate 74. Concentrically within the tubular portion 71 is a tubular liner generally indicated at 75 which is supported in spaced relation in a concentric position from the tubular outer casing 71 by transverse apertured webs 76 and 77 toward the bottom and top respectively. The bottom end of the liner 75 has an apertured bottom plate 78 through which the burners 79 extend that are fed by a fuel line 80. The burner stems 79′ extend through enlarged apertures 78′ in plate 78 and these enlarged apertures form passages for combustion air to the burners. The upper end of line 75 has mounted thereon a converging collar 75′ through which exhaust gases from the burners 79 pass into the tubular casing 72 and out through a positive draft head 16 mounted on the top of casing 72.

Positive draft head 16 as shown in Fig. 12 is like that as shown in Figures 1 and 2. Combustion air enters through this positive draft head 16 and passes downwardly through the casing 72 and through the annular elongated passage generally indicated at 81 formed between the concentric liner 75 within the casing 71.

Each of the furnaces shown in Figures 11 and 12 have a reserve air chamber below their burners. Such a reserve air chamber is shown for furnace 60 at 60' and for furnace 70 at 70'.

While I have illustrated my positive draft head or air inlet head 16 as being used with a furnace, it may equally as well be used wherever a positive draft is required as in pipe chambers carrying pipes giving off heat, engine room stacks and other compartments that are to be ventilated. With the positive draft head, closed bottom end furnaces are made operable since exchange of air for combustion and exhaust gases is enhanced through the same tubular casing.

I claim as my invention:

1. In combination with a chamber having a gas inlet opening for communication with the atmosphere outside said chamber, a positive draft inlet head for attachment to said opening in the chamber and solely through which a gas communication between the chamber and the outside atmosphere is to be maintained, said positive draft inlet head maintaining the same atmospheric pressure condition within the chamber as exists outside the chamber acting on the positive draft inlet head, said positive draft inlet head comprising a tubular housing for attachment to and in communication with said chamber, said housing having a plurality of interconnected planar sides, an imperforate end attached to said planar sides and oppositely positioned to their attachment of said chamber, said sides having a plurality of approximately uniformly spaced rows of spaced apart apertures therein, said apertures in each of the rows being of an approximately uniform size and having a total area permitting free flow of gas therethrough to supply a minimum to maximum gas draft demand within the chamber equivalent to conditions of a still-day existing outside said positive draft inlet head even though atmospheric and wind conditions outside said positive draft head may vary, each row of apertures lying in an approximately common plane normal to said planar sides.

2. In combination with a chamber having an air inlet aperture through which a positive draft is to be supplied to the chamber, a positive draft inlet head attached to said chamber and in communication with said aperture therein and comprising, a plurality of interconnected planar sides, forming an elongated sleeve having a central axis about which said planar sides are substantially uniformly positioned, a plate member attached to one end of said planar sides and closing off that end of the sleeve, a base plate at the other end of said sleeve and connected to said planar sides, said base plate having an aperture extending therethrough and having its center lying substantially on the central axis of said sleeve, an open ended thimble connected at one end to said base plate at the aperture thereof and extending outwardly from said sleeve with the axis of the thimble substantially coinciding with the central axis of said sleeve, said thimble being telescopically connected to said chamber at said air inlet aperture thereof, said sides having a plurality of uniformly spaced rows of spaced apart apertures therein, said apertures in each of the rows being of uniform size and having a total area permitting free flow of air therethrough to supply a minimum to a maximum air draft demand in said chamber equivalent to conditions of a still-day existing outside said positive draft inlet head even though atmospheric and wind conditions outside said positive draft head may vary, and each row of apertures lying in a common plane normal to said planar sides.

3. The apparatus according to claim 2 including a tubular housing extending from said chamber about said aperture therein and wherein said thimble of the head is telescopically received over the end of said tubular housing connection remote from said chamber and securing means are provided on said thimble for adjustably positioning said thimble on the end of said tubular housing.

4. A furnace comprising, in combination, an air inlet housing having an air inlet aperture and a second aperture, said air inlet housing at its second aperture being attached to the furnace and in communication with the firebox thereof for transferring air to support combustion in the furnace, an exhaust stack leading from said furnace and a positive draft inlet head attached to the air inlet housing for affording a positive draft to the furnace firebox on an air demand condition in said firebox, said positive draft head comprising, a plurality of interconnected planar sides forming an elongated sleeve having a central axis about which said planar sides are substantially uniformly positioned, a plate member attached to one end of said planar sides and closing off that end of the sleeve, a base plate at the other end of said sleeve and connected to said planar sides, said base plate having an aperture extending therethrough and having its center lying substantially on the central axis of said sleeve, an open ended thimble connected at one end to said base plate at the aperture thereof and extending outwardly from said sleeve with the axis of the thimble substantially coinciding with the central axis of said sleeve, said thimble being telescopically connected to said air inlet housing at said air inlet aperture thereof, said sides having a plurality of uniformly spaced apart rows of spaced apart apertures therein, said apertures in each of the rows being of a uniform size and having a total area permitting free flow of air therethrough to supply a minimum to a maximum air draft demand in said firebox equivalent to conditions of a still-day existing outside said positive draft inlet head even though atmospheric and wind conditions outside said positive draft head may vary and each row of apertures lying in a common plane normal to said planar sides.

5. A furnace of the character described in claim 4 wherein said air inlet housing extends upwardly from said furnace and furnace firebox with which it is connected and said positive draft inlet head attached to said air inlet housing is positioned at a greater height above said furnace than is the height of the outlet of said exhaust stack above said furnace, whereby inlet draft air for the furnace firebox is admitted from a greater height above said furnace than is the height of the discharge of exhaust gases from the exhaust stack leading from said furnace.

6. In a furnace, an air inlet housing attached to the furnace and in communication with the firebox thereof, said housing having a portion thereof extending below the opening to the furnace firebox and forming a reserve air supply chamber, a positive draft inlet head mounted on said housing and extending upwardly therefrom and in communication therewith for supplying air thereto, said head having a plurality of interconnected upwardly extending planar sides forming a casing in communication with said air inlet housing, a plate member interconnected to the upper end of said planar sides, said planar sides having a plurality of uniformly spaced apart rows of spaced apart apertures extending therethrough, said apertures in each of the rows being of uniform size and having a total area permitting free flow of air therethrough to supply a minimum to maximum air draft demand in said firebox, each row of apertures lying in a common plane normal to said planar sides, whereby on an initial air demand as when lighting off said furnace air is supplied from said reserve air chamber and a positive draft is then provided through said draft inlet controller and into said air inlet housing and furnace firebox regardless of outside wind conditions acting on said apertured planar sides.

7. In combination with a furnace, an air inlet housing attached to the furnace and in communication with the firebox thereof and having a portion extending upwardly therefrom and in communication therewith a positive draft inlet head attached to the top of said air inlet housing and an exhaust stack in communication with the furnace extending upwardly in spaced relation within said air inlet housing upwardly extending portion, said exhaust stack terminating within said upwardly extending air inlet portion, said positive draft inlet head comprising a tubular housing for attachment to and in communication with said chamber, said housing having a plurality of interconnected planar sides, an imperforate top end attached to said planar sides and oppositely positioned to their attachment to said air inlet housing, said sides having a plurality of approximately uniformly spaced rows of spaced apart apertures therein, said apertures in each of the rows being of an approximately uniform size and having a total area permitting free flow of air therethrough to supply a minimum to a maximum air draft demand in said firebox equivalent to conditions of a still-day existing outside said positive draft inlet head even though atmospheric and wind conditions outside said positive draft head may vary, each row of apertures lying in an approximately common plane normal to said planar sides, whereby a positive air draft to support combustion in said furnace firebox is supplied through said positive draft inlet head and housing and air to support combustion moves downwardly through said air inlet housing while exhaust gases from said stack move upwardly.

8. A furnace of the character described in claim 7 wherein said air inlet housing has a further portion thereof which extends below the air intake of said furnace firebox to form a reserve combusion air supply chamber for said furnace.

9. In combination with a furnace, an air inlet housing attached to the furnace and in communication with the air inlet of the firebox thereof and having a tubular portion extending upwardly from the air inlet housing and in communication therewith, an exhaust stack in communication with the furnace and extending upwardly in spaced relation within said tubular air inlet housing, said exhaust stack terminating well short of the top of its surrounding air inlet tubular portion of the air inlet housing, and a positive draft head attached to the top of said tubular air inlet housing for supplying a positive downward draft to said air inlet housing and conducting exhaust gases upwardly through said tubular air inlet portion and out through said positive draft head, said positive draft head having a plurality of interconnected upwardly extending planar sides forming a casing in communication with said tubular air inlet housing portion, said planar sides having a plurality of uniformly spaced apart rows of spaced apart apertures extending therethrough, said apertures in each of the rows being of uniform size and having a total area permitting free flow of air therethrough to supply the maximum air draft demand in said furnace firebox, each row of apertures lying in a common plane normal to said planar sides, said apertures in the planar sides also furnishing an exit for said exhaust gases from said furnace stack.

10. The apparatus according to claim 9 wherein said air inlet housing attached to the furnace and in communication with the firebox thereof has a further portion thereof which extends below the air intake of said furnace firebox to form a reserve combustion air supply chamber for said furnace.

11. In combination with a vertically extending furnace having a tubular casing and burners in the bottom thereof, a positive draft head attached to and in communication with the bottom of said tubular casing, said positive draft head having a plurality of interconnected downwardly extending planar sides forming a casing in communication with said tubular casing at the bottom thereof, a plate closing off the lower end of the casing formed by the planar sides said planar sides having a plurality of approximately uniformly spaced apart rows of spaced apart apertures extending therethrough, said apertures in each of the rows being of approximately uniform size and having a total area permitting free flow of air therethrough to supply a minimum to a maximum air draft demand in said furnace and each row of apertures lying in an approximately common plane normal to said planar sides, said positive draft controller supplying minimum to maximum air draft demand of said furnace regardless of outside wind conditions acting on said furnace and draft controller.

12. Apparatus of the character described in claim 11 including a draft equalizing stack head attached to the top of said furnace, said draft equalizing stack head having a vertical tubular wall forming a flue therein, an imperforate top and an open bottom connected with the top of said tubular casing of the furnace, said vertical tubular wall having a plurality of horizontally disposed rows of apertures therethrough, said rows being spaced substantially uniformly from each other, each horizontal row of apertures having an even number of apertures disposed in uniformly spaced relationship throughout the whole circumference of said vertical tubular wall, each of said apertures being of uniform area, said apertures being disposed in each horizontal row so that each aperture has an oppositely disposed aperture in horizontal alignment therewith, the total area of said apertures being sufficient to permit free movement of exhaust gases from the furnace as determined for still day operating conditions for the furnace.

13. In combination with a vertically disposed furnace having a closed bottom end and an open top end, a positive draft head attached to the top end of said vertically extending furnace for exchange of combustion air and exhaust gases therethrough, said positive draft head having a plurality of interconnected upwardly extending planar sides forming a casing in communication with the top of said vertical furnace, said planar sides having a plurality of uniformly spaced apart rows of spaced apart apertures extending therethrough, said apertures in each of the rows being of uniform size and having a total area permitting free flow of air therethrough to supply a minimum to a maximum air draft demand in said furnace, regardless of outside wind conditions acting on said planar sides, each row of apertures lying in a common plane normal to said planar sides, some of the said apertures in the planar sides also furnishing an exit passage for said exhaust gases from said furnace.

14. A furnace of the character described in claim 13 wherein said furnace has at the bottom thereof a reserve air supply chamber in communication with said furnace.

References Cited in the file of this patent

UNITED STATES PATENTS

| 182,681 | Knight | Sept. 26, 1876 |
| 1,116,832 | Milner et al. | Nov. 10, 1914 |
| 1,930,050 | Hilt | Oct. 10, 1933 |
| 2,582,066 | Resek | Jan. 8, 1952 |
| 2,656,833 | Moran | Oct. 27, 1953 |